(12) United States Patent
Flykt et al.

(10) Patent No.: US 7,366,303 B2
(45) Date of Patent: Apr. 29, 2008

(54) INTEGRITY PROTECTION DURING INITIAL REGISTRATION OF A SUBSCRIBER IN A TELECOMMUNICATIONS NETWORK

(75) Inventors: Patrik Flykt, Helsinki (FI); Valtterie Niemi, Helsinki (FI); Jaakko Rajaniemi, Helsinki (FI); Aki Niemi, Helsinki (FI)

(73) Assignee: Nokia Siemens Networks Oy, Espoo (FI)

( * ) Notice: Subject to any disclaimer, the term of this patent is extended or adjusted under 35 U.S.C. 154(b) by 984 days.

(21) Appl. No.: 10/432,220

(22) PCT Filed: May 21, 2001

(86) PCT No.: PCT/EP01/05832

§ 371 (c)(1),
(2), (4) Date: May 22, 2003

(87) PCT Pub. No.: WO02/45452

PCT Pub. Date: Jun. 6, 2002

(65) Prior Publication Data

US 2004/0029576 A1    Feb. 12, 2004

(30) Foreign Application Priority Data

Nov. 28, 2000   (WO) .................. PCT/EP00/11889

(51) Int. Cl.
*H04K 1/00*    (2006.01)
(52) U.S. Cl. ...................... 380/247; 380/270
(58) Field of Classification Search ........... 380/247, 380/270; 713/168
See application file for complete search history.

(56) References Cited

U.S. PATENT DOCUMENTS 5,371,794 A    12/1994 Diffie et al.

(Continued)

FOREIGN PATENT DOCUMENTS

EP    1 005 244 A1    5/2000

(Continued)

OTHER PUBLICATIONS

Bjornland et al, "CTM Internetworking: Extending the CTM Authentication Feature to Roaming Users", IEEE, Nov. 18, 1996, XP-000741606, pp. 1146-1150.

(Continued)

*Primary Examiner*—Emmanuel L. Moise
*Assistant Examiner*—Ali S Abyaneh
(74) *Attorney, Agent, or Firm*—Squire, Sanders & Dempsey, L.L.P.

(57) ABSTRACT

A network system is proposed comprising a network control element and a communication device (UE) associated to a subscriber, wherein the communication device (UE) is adapted to send a registration message (A8) including subscriber information to be protected and an integrity code (MAC), to the network control element, wherein the communication device (UE) is adapted to calculate the integrity code (MAC) by using a part or whole of the registration message (A8) including the subscriber information to be protected, and the network element is adapted to verify the integrity code (MAC) included in the registration message. Also a case is proposed in which the integrity code is calculated in the network control element and verified in the communication device (UE). Furthermore, corresponding methods are proposed.

55 Claims, 4 Drawing Sheets

U.S. PATENT DOCUMENTS 6,584,310 B1 * 6/2003 Berenzweig ............ 455/432.1

FOREIGN PATENT DOCUMENTS

| EP | 1005244 A1 * | 5/2000 |
| WO | WO 00/35223 | 6/2000 |
| WO | WO 00/69206 | 11/2000 |

OTHER PUBLICATIONS

"SIP: Session Initiation Protocol", Handley et al, Network Working Group RFC2543, Online Mar. 31, 1999, XP002162525 Retrieved from the Internet: URL:http://www.ietf.org/rfc/rfc2543.txt retrieved on Aug. 15, 2001.

* cited by examiner

INTEGRITY PROTECTION DURING INITIAL REGISTRATION OF A SUBSCRIBER IN A TELECOMMUNICATIONS NETWORK

FIELD OF THE INVENTION

The present invention relates to a method a network system for performing authentication of a subscriber and/or subscriber information and/or security information which like a device related capability information transmitted during the registration.

BACKGROUND OF THE INVENTION

The present invention concerns authentication of a subscriber, and particularly a registration involved in such an authentication.

The general procedure for performing an authentication is described in the following in short. The authentication procedures are similar in GSM and UMTS. Thus, in the following the authentication procedure is described by referring to GSM as an example.

An authentication is usually required when a subscriber registers to the network services. Also an authentication may be required when a connection is established, i.e. when originating or terminating a call. The authentication is performed, for example, in an Authentication Center (AuC) which is usually provided in the Home Location Register (HLR). The VLR to which the MS is currently connected requests a parameter set consisting of a random number RAND (usually, 128 bit) and a scheduled result (RES) from the HLR and sends the RAND to the MS. In turn, the MS has to calculate a result CRES from the number RAND.

The SIM card of the subscriber comprises a secret subscriber key Ki which is, apart from the SIM, only known to the network operator (HLR/AuC). The SIM card also comprises an algorithm (A3 ). By using this algorithm, from RAND and Ki a result CRES is calculated (CRES=A3 (RAND,Ki)). This result CRES is transmitted to the VLR which in turn checks whether the result is equal to the signed result received from the HLR/AuC, i.e., whether CRES=RES. If this is correct, the authentication is successful.

The above described example is the authentication procedure in GSM. As mentioned above, in UMTS, the authentication of a subscriber is performed similarly. Here, the SGSN (which corresponds to the VLR) requests a parameter set from the HSS (which corresponds to the HLR) comprising a random number RAND, the result RES (which should be the result CRES calculated by User Equipment (UE)), a ciphering key CK, an integrity key IK and an authentication token AUTN. Instead of a SIM card as in GSM, the subscriber uses a so-called USIM (Universal Services Identity Module) which is a logical module implemented e.g. inside a smart card. In comparison to GSM, under UTMS additional functions are provided by the USIM. For example, the USIM checks the authenticity of the network by using the authentication token AUTN.

Nevertheless, authentication of the subscriber is performed similarly to the procedure under GSM. That is, a home network control element (like I-CSCF or the like) sends the parameter to a serving network element (i.e., the SGSN or P-CSCF) which forwards the parameters RAND and AUTN to the USIM. The USIM calculates a result RES from the random number RAND and a secret subscriber key Ki and sends the result back to the serving network element.

Thus, by checking the result, it is possible to decide whether the subscriber is allowed to use the services or not.

However, in the above example the subscriber has to forward critical information to the network. In particular, it has to be assured that the critical fields in the SIP registration, e.g., To From and Contact are not corrupted, manipulated or the like.

This problem also occurs in other cases in which a user has to perform an initial registration.

SUMMARY OF THE INVENTION

Therefore, the object underlying the invention resides in removing the above drawbacks of the prior art and to enable a reliable protection of critical information.

This object is solved by a network system comprising a network control element and a communication device associated to a subscriber, wherein the communication device is adapted to send a registration message including subscriber information to be protected and an integrity code, to the network control element, wherein the communication device is adapted to calculate the integrity code by using a part or whole of the registration message including the subscriber information to be protected, and the network element is adapted to verify the integrity code included in the registration message.

Alternatively, the object is solved by a network system comprising a network control element and a communication device associated to a subscriber, wherein the network control element is adapted to receive a registration message from the communication device, to calculate an integrity code by using a part or whole of a message including subscriber information to be protected and to send a message to the communication device, which includes the information to be protected and the integrity code, and the communication device is adapted to verify the integrity code.

Alternatively, the object is solved by a method for performing registration of a subscriber in a network system, comprising a network control element and a communication device associated to a subscriber, said method comprising the steps of sending a registration message including subscriber information to be protected and an integrity code to the network control element, calculating the integrity code by using a part or whole of the registration message including the subscriber information to be protected, and verifying the integrity code in the network control element.

Alternatively, the object is solved by method for performing registration of a subscriber in a network system, comprising a network control element and a communication device associated to a subscriber, said method comprising the steps of sending a registration message from the communication device to the network control element, calculating an integrity code by using a-part or whole of the registration message including subscriber information to be protected, sending a message to the communication device, which includes the information to be protected and the integrity code and verifying the integrity code in the communication device.

Thus, according to the invention, an integrity protection for the user performing an initial registration is provided. That is, critical subscriber information can be protected.

According to the invention, there is no public key infrastructure required, since according to the invention an security algorithm based on parts of exchanged messages is used. Hence, the invention can be applied in a so-called shared secret case.

The registration message may be a SIP (Session Initiation Protocol) REGISTER message. The subscriber information to be protected may comprise information regarding the originator of the registration message (e.g., From field in SIP), and/or information regarding the subscriber to be registered (e.g., To field in SIP) and/or a contact field (Contact field in SIP) Also other information or information fields are possible. For example, the subscriber information may comprise the Request-URL (Uniform Resource Locator) field which is the address of the register to which the registration should be sent.

A message including algorithm capability information may be sent from the communication device to the network control element. Furthermore, the network control element may choose which algorithm is to be used for calculating the integrity code and forward a message including information about the chosen algorithm to the communication device (UE).

That is, a so-called classmark may be included in the message. The classmark refers to the security algorithms capability of the terminal. Hence, this indication (classmark) may be used in case several algorithms are used in the system.

Thus, according to the invention, the problem is solved how the integrity protection is to be setup. This means that the algorithm used is negotiated in a secure way (namely, by using the indication or classmark), and also the starting point of the integrity protection is defined (namely, either in the communication device on sending the registration message or in the network control element on sending the response message to the communication device).

That is, according to the invention, a negotiation of a security algorithm works typically in the following that the terminal tells to the network what it is capable of, i.e. the classmark, the network chooses the security algorithm and tells that to the terminal. Also the network indicates the capability information (i.e. classmark) from which it made the selection for the security algorithm.

The communication device may be adapted to forward the algorithm capability information with the registration message, and the network control element may adapted to verify the algorithm capability information.

That is, the network can check whether the classmark is the same as in the beginning of procedure.

Also, the network control element may be adapted to forward the algorithm capability information with the message including the information to be protected to the communication device, wherein the communication device may be adapted to verify the algorithm capability information.

Thus, also the communication device may check that after the procedure the classmark is the same as in the beginning.

An authentication of the subscriber may be performed. Hence, advantageously the procedure according to the invention is combined with an authentication which requires the registration.

The authentication may be performed by using the integrity code. That is, the network control element can use the integrity code as a result which has to be compared with a scheduled result. By this measure, only one code has to be calculated and forwarded, which reduces operation and signaling load.

The network system may further comprise an additional network control element which is adapted to perform an additional authentication. Hence, two separated authentications may be performed in order to have a more reliable authentication.

The network control element may control a first network, and the additional network control element may control a second network. Thus, the two authentications may be performed by two different networks individually.

The network system may further comprise an additional network control element for performing an additional authentication, wherein a result is calculated in the communication device from a predetermined number supplied by the additional network control element, and the additional authentication may be performed in the additional network control element by using the result. Thus, the two network elements may perform the authentications independently from each other.

In particular, the invention is advantageously applicable to such a case in which two networks perform authentications independently from each other. Namely, one network may use the predetermined number and the result calculated by the communication device for authentication, and the other network element may use the integrity code for authentication. In this way, the authentication procedure as a whole can be made more reliable, since both network use fully separated codes for their authentications of the subscriber.

The additional authentication may be performed by comparing the result received from the communication device with a scheduled result.

The predetermined number and the scheduled result may be provided by a home subscriber database (HSS), an Authentication Centre (AuC) or an Authentication Authorization and Accounting server (AAA).

The calculation of the integrity code may be performed by using GSM or UMTS algorithms.

The message including information to be protected may be the registration message received from the communication device (UE), or may be a response message (e.g., a 200 OK response) sent from the network in response to the registration message from the communication device.

The invention also proposes a network system comprising a network control element and a communication device associated to a subscriber, wherein
the communication device is adapted to send a registration message including algorithm capability information to the network control element, wherein
the network control element is adapted to choose which algorithm is to be used for calculating an integrity code and to send a corresponding message to the communication device, wherein
the network control element and/or the communication device is adapted to verify the algorithm capability information on a later transmittal of a message including the algorithm capability information.

Furthermore, the invention proposes a method for performing registration of a subscriber in a network system comprising a network control element and a communication device associated to the subscriber, the method comprising the steps of
sending a registration message including algorithm capability information from the communication device to the network control element, choosing which algorithm is to be used for calculating an integrity code, sending a corresponding message to the communication device and verifying the algorithm capability information on a later transmittal of a message including the algorithm capability information in the network control element and/or the communication device.

In this way, the algorithm used for calculating an integrity code is negotiated in a secure way. Namely, the information regarding the algorithm (classmark as described above) is included in the messages.

The integrity code may be calculated by the communication device by using a part or whole of a registration message, and the registration message and the integrity code may be forwarded to the network control element. In addition, information regarding the used algorithm may be forwarded to the network control element.

Furthermore, the integrity code may be verified by the network control element on receiving the registration message from the communication device by using the information regarding the used algorithm.

The network control element may calculate an integrity code by using a part or whole of a registration message received from the communication device and forward a message and the integrity code to the communication device. Also, information regarding the used algorithm may be forwarded to the communication device.

The communication device may verify the integrity code on receiving the message from the network control element. Moreover, in case also information regarding the used algorithm were forwarded, the communication device may use this information for verifying the integrity code as well.

It is noted that the above-described integrity code may be included in the corresponding messages or may be forwarded in a separate message. Also, the information regarding the chosen algorithm (classmark) may be included in the corresponding message or may be forwarded in a separate message.

BRIEF DESCRIPTION OF THE DRAWINGS

The present invention will be more readily understood with reference to the accompanying drawings in which.

DETAILED DESCRIPTION OF EMBODIMENTS

In the following, preferred embodiments of the invention are described in more detail with reference to the accompanying drawings.

Figure 1:
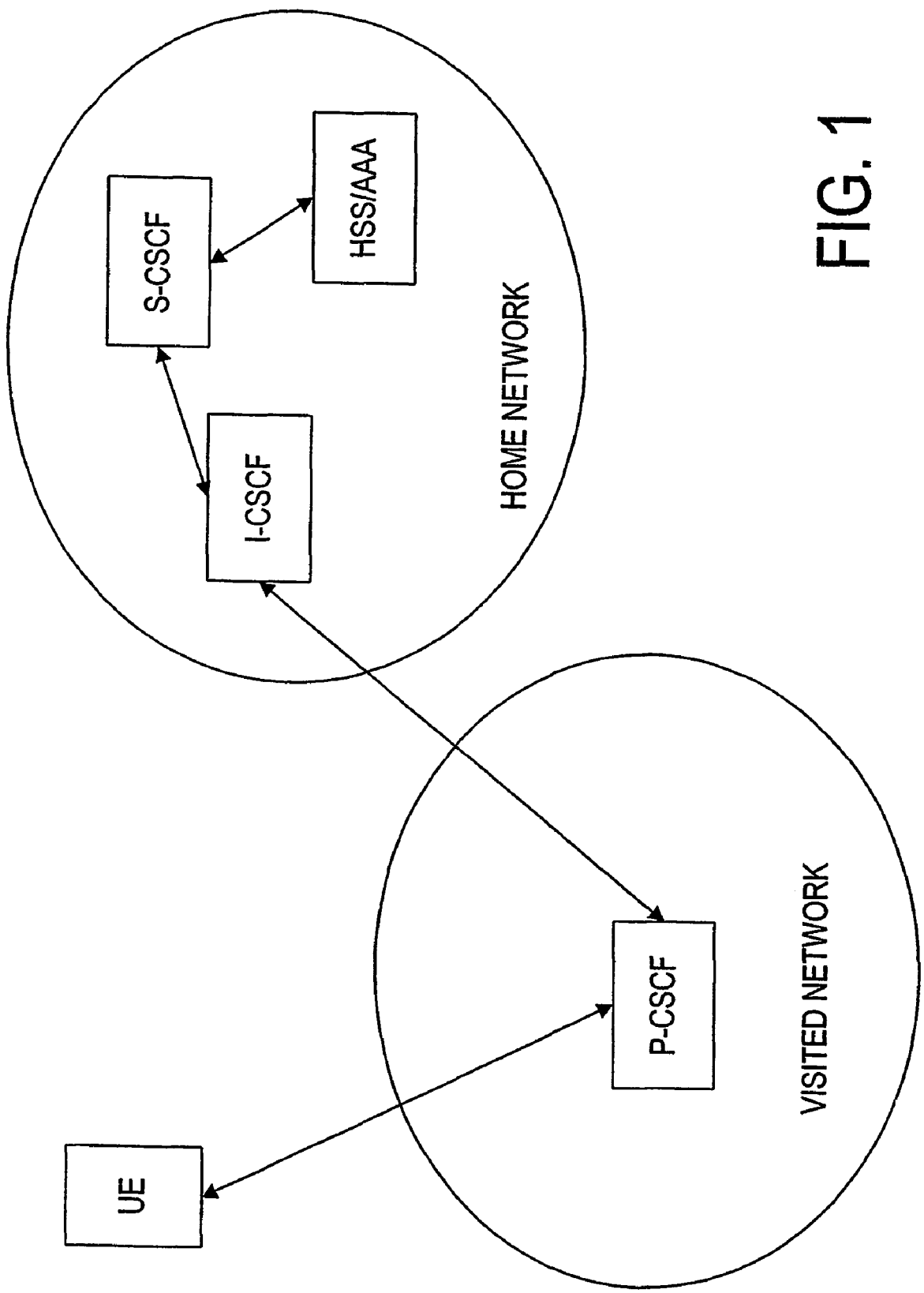
FIG. 1 shows a network system to which the embodiments are applied.

In the description of the embodiments, a network system as schematically illustrated in FIG. 1 is taken as an example. In detail, this system consists of two networks which both are Internet Multimedia Core Network Subsystems (IM CN SS). In the figure, only the main elements are shown.

Both networks contain CSCFs (Call State Control Functions). A User Equipment (UE), which may be a mobile station (MS), is connected to the home network S-CSCF via the P-CSCF if the home network controls the connections.

In this case, it is assumed that the subscriber is roaming in a network which is not the home network of the subscriber using the UE. Thus, this network is designated as the visited network.

For an authentication procedure and the like, the P-CSCF contacts the home network of the subscriber. That is, the P-CSCF contacts an Interrogating CSCF (I-CSCF) of the home network which is capable of accessing a Home Subscriber Server (HSS).

It is noted that the connection may be controlled by the visited network. In this case, the connection is not controlled by the S-CSCF in the home network (as shown in FIG. 1) but by a S-CSCF in the visited network.

Figure 2:
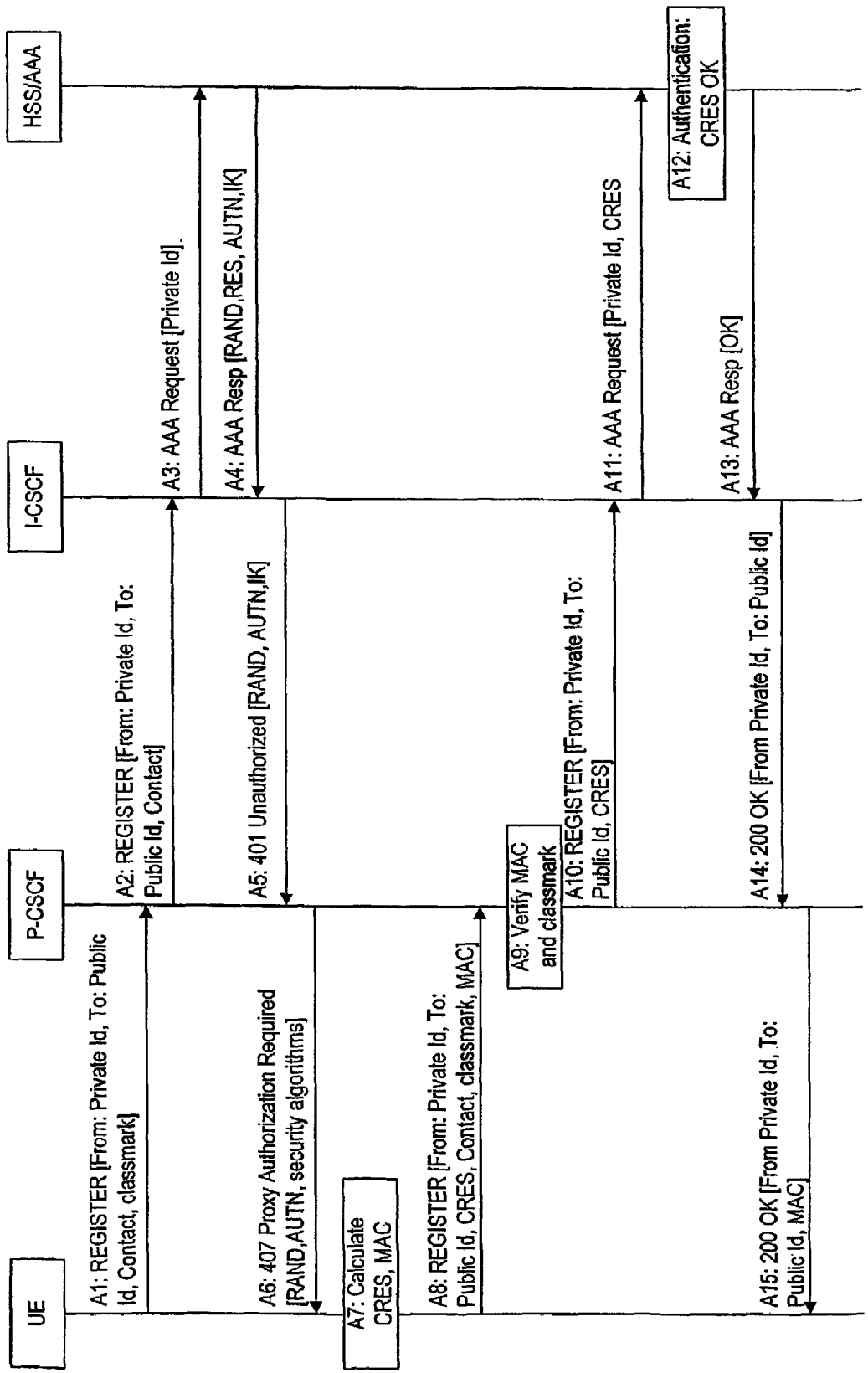
FIG. 2 shows a UMTS authentication procedure according to a first embodiment.
Figure 3:
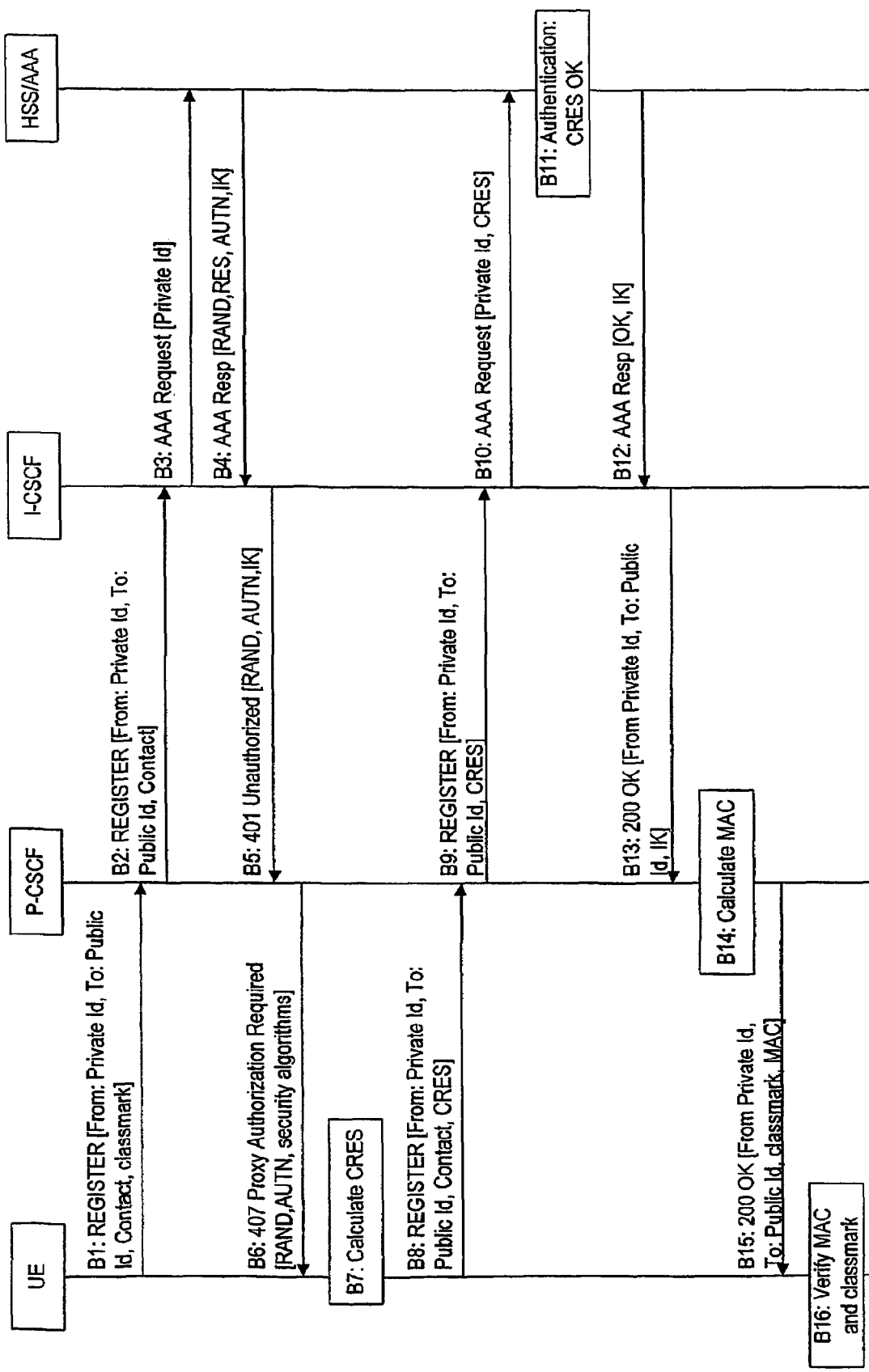
FIG. 3 shows a UMTS authentication procedure according to a second embodiment.

The procedures performed during authentication of the subscriber are described in the first and second embodiments by referring to FIGS. 2 and 3.

According to these embodiments, the authentication is performed by the I-CSCF (or S-CSCF or HSS or a separate network element such as AAA (Authentication Authorization and Accounting server)) and the P-CSCF. Thus, both the serving network (controlled by the P-CSCF) and the home network (controlled by the I-CSCF) are able to verify that the authentication was performed correctly. In the following, it is assumed that the authentication in the home network is performed by the I-CSCF. Thus, in the signaling diagrams of FIGS. 2 to 3, the S-CSCF are omitted.

FIG. 2 shows a signaling flow of an authentication procedure according to the first embodiment.

In case the user registers to the network, the UE sends a registration request to the P-CSCF (step A1). This can be a SIP (Session Initiation Protocol) REGISTER message, for example. In this example, the SIP REGISTER message contains the header fields From, To and Contact. The From field indicates the user address (i.e., Private Identity (Id)), and the To field indicates the destination address (i.e., the Public Identity). Furthermore, the REGISTER message contains a parameter "classmark", which will be described later.

The P-CSCF forwards this request to the home network, i.e., to the I-CSCF (step A2) since in order to perform authentication, the P-CSCF has to obtain the necessary authentication information. The I-CSCF, in turn, sends a GetAuthInfo (Get Authorization Information) message to the HSS or AAA (step A3).

The HSS responds with an Authorization Information Response (AuthInfoResp) (step A4). This response includes a plurality of parameters RAND, RES, AUTN, IK. In particular, a random number RAND is sent. The number RAND is intended for an authentication check performed by the home network. In addition, also a scheduled result (i.e., the result which should be calculated by the UE) is included in the parameters, namely RES.

The I-CSCF forwards a 401 Unauthorized message to the P-CSCF (step A5) including RAND, AUTN and IK. The P-CSCF retrieves RES from the parameters and forwards a 407 Proxy Authorization Required message to the User Equipment (UE) (step A6) including RAND and AUTN. Furthermore, an indication of used security algorithms is also included into this message.

Then, the UE uses the number RAND to calculate a result CRES (step A7). The calculation is performed by using a special predetermined algorithm (e.g. UMTS algorithms) and a secret subscriber key Ki which are stored on the USIM card of the subscriber and which are only known to the HSS.

In addition, the UE may calculate a message authorization code (MAC) by using, e.g., the ciphering key CK or integrity key IK. However, according to the present embodiment, the MAC is calculated from some other part of the SIP message or whole SIP message which is to be sent in step B8. The MAC may be included in a SIP Authorization field or the like (step B7). If the MAC is calculated over the whole REGISTER (B8) message then the subscriber information e.g. From, To and Contact fields information are also authenticated and protected. That is, in order to protect these fields, at least the parts corresponding to the fields should be used for calculating the MAC. It is noted that in this connection the "whole message" refers to the whole REGISTER message without the MAC field.

Thus, after completing the calculations, the UE sends a register message including RES and MAC to the P-CSCF (step A8). In step A8, also the so-called classmark is sent. The classmark refers to the security algorithms capability of the UE. That is, the classmark indicates which algorithm has actually been used for calculating MAC. The classmark has to be included into the messages only in case several algorithms are used in the systems. This, however, is a most probable case.

In detail, the classmark serves to perform a security negotiation. The terminal (i.e., UE) tells the network (i.e., P-CSCF) of which security algorithms it is capable of. This is performed in step A1, in which the UE includes the classmark into the REGISTER message. Thereafter, the network chooses the security algorithms and indicates this to the terminal. According to the present embodiment, this is performed in step A6 in which the P-CSCF includes the security algorithms information into the 407 message (A6).

In step A9, the P-CSCF verifies the MAC and classmark. That is, the P-CSCF calculates itself a MAC from the corresponding parts of the message, as it is performed in step A7 in the UE. In case both results are the not the same, the authentication fails and the registration request is rejected.

Otherwise, if both results are the same (i.e., MAC calculated by the UE=Mac calculated by P-CSCF), the P-CSCF forwards a register message including CRES and MAC to the I-CSCF (step A10). The I-CSCF verifies the authorization by forwarding an AAA Request to the HSS/AAA (step A11). The AAA performs a check in step A12 by comparing the calculated result CRES with the scheduled result RES. If the two numbers are not the same, the authentication fails and the registration request is rejected.

Otherwise, in step A13 a positive AAA Response is forwarded to the I-CSCF, which in turn forwards a 200 OK message to the UE via the P-CSCF in steps A14 and A15.

The 200 OK messages contain also the original From and To fields such that the UE can check whether these fields have been corrupted.

It is noted that it is also possible to verify MAC in the I-CSCF and to verify CRES in the P-CSCF. Furthermore, the verification of CRES can be performed by the I-CSCF or the P-CSCF alone without referring to the AAA by using the scheduled result RES.

It is noted that the above embodiment is applied to a case in which there is a network system comprising a visited network and a home network. However, the embodiment may also be applied to a case in which the user (UE) is attached only to his home network, i.e., in which the P-CSCF and the I-CSCF are part of his home network.

Thus, according to the first embodiment the UE calculates CRES from RAND and the secret subscriber key Ki by using a predetermined algorithm. In addition, the UE calculates a message authentication code (MAC) which may be calculated from some other part of the SIP message including the subscriber information. Since the MAC is verified in the P-CSCF, according to the first embodiment an early integrity protection is performed.

According to a second embodiment, a late integrity protection is performed. That is, according to the second embodiment the subscriber information (e.g. From, To and Contact fields) of the registration message may also be authenticated and protected by the user when he receives an acknowledgment (200 OK message) to the registration from the network. The user verifies the subscriber information (e.g., From, To and Contact) fields in the acknowledgment message that they are the same which were included into the registration message sent by the user.

FIG. 3 shows the signaling flow according to the second embodiment.

According to the second embodiment, basically the same situation is assumed as described above by referring to FIG. 1. That is, two networks, a visited network and a home network are involved. In this example, authentication takes place only in the home network.

Steps B1 to B6 are identical to steps A1 to A6 of FIG. 2. In step B7, the UE only calculates CRES, but not the message authentication code MAC. Thus, in step B8, only the subscriber information fields and CRES are included. In step A9, this register message is forwarded from the P-CSCF of the visited network to the I-CSCF of the home network. The I-CSCF performs the authentication in steps B10 to B12 as described above in the steps A11 to A13 of FIG. 2. In step B13, the positive result is forwarded to the P-CSCF.

In step B14, the P-CSCF calculates a message authentication code (MAC) by using the subscriber information, i.e., by using that part of the registration message B8 which comprises these fields.

As the security algorithm for calculating the MAC, the P-CSCF uses the security algorithm(s) which were negotiated in steps B1 and B6.

It is noted that alternatively also the 200 OK response message B13 may be used for calculating the authentication code (integrity code), since also this message contains the subscriber information to be protected.

In step B15, the 200 OK message including MAC and classmark (which indicates the used algorithm) is forwarded to the UE. The UE verifies in step B16 MAC and classmark. That is, the user is able to verify whether the subscriber information is still the same as sent to the network in the registration message B8.

It is noted that also according to the second embodiment, only one network may be present. That is, both P-CSCF and I-CSCF may be located in the home network.

Moreover, also according to the second embodiment an additional authentication may be performed in the visited network. That is, in step B7 another value (e.g., a different MAC calculated form another part of the SIP message) may be used for this authentication.

Figure 4:
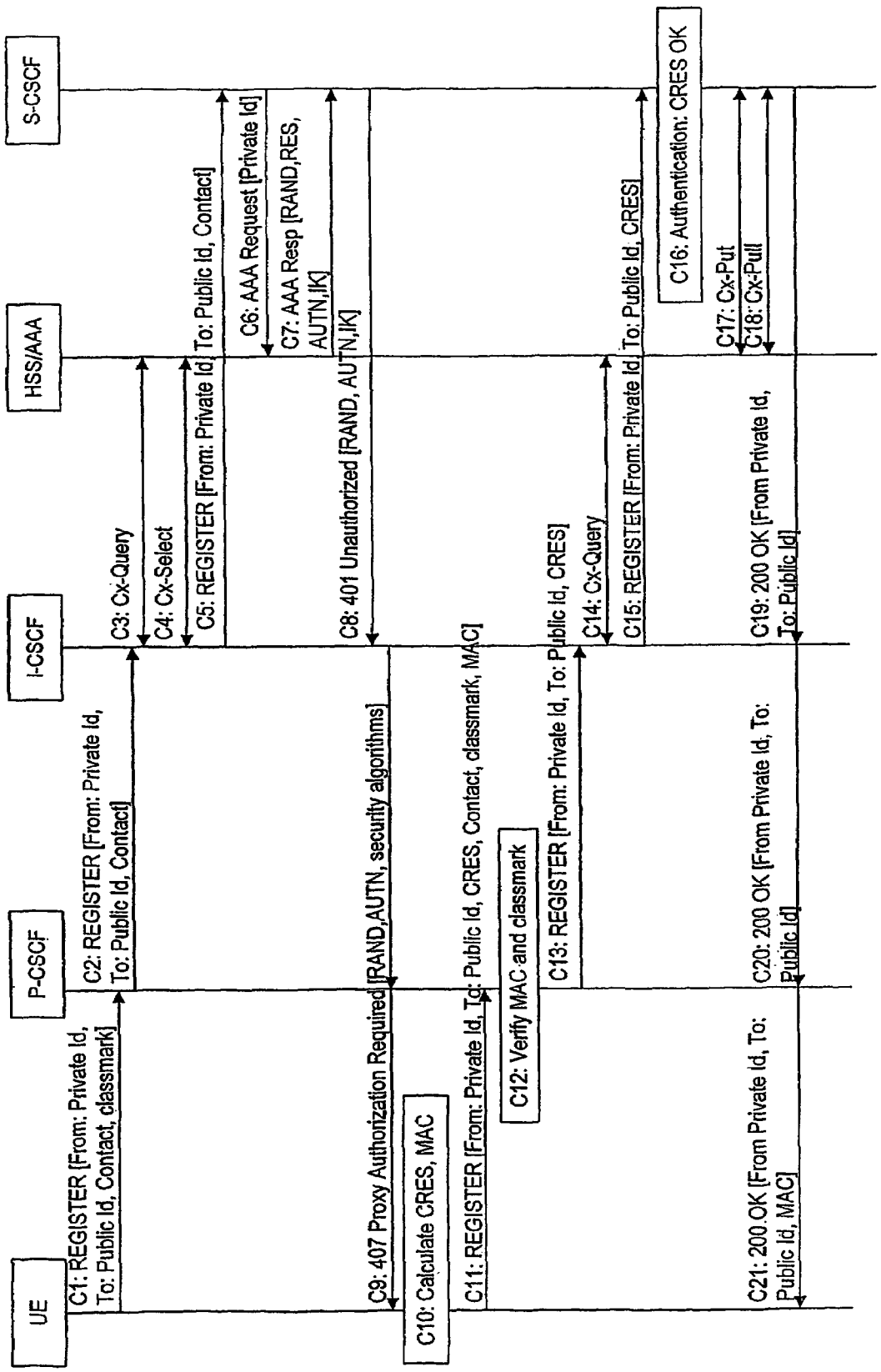
FIG. 4 shows a UMTS authentication procedure according to a second embodiment.

In the following, a third embodiment of the invention is described by referring to FIG. 4.

The signalling is almost the same as in case of the first embodiment described with reference to FIG. 2. The difference to the first embodiment is that according to the third embodiment the authentication is performed in the S-CSCF (serving CSCF).

Thus, in the following only the differences to the first embodiment are described.

After the I-CSCF has received the REGISTER message (C2), the I-CSCF performs a Cx-Query to the HSS in order to obtain the correct S-CSCF in steps C3 and C4.

It is noted that it is defined in the specifications that the I-CSCF shall send the Cx-Query information flow to the HSS (P-CSCF name, subscriber identity, home domain name, visited network contact name). The P-CSCF name is the contact name that the operator wishes to use for future contact to that P-CSCF. The HSS shall check whether the user is registered already. The HSS shall indicate whether the user is allowed to register in that visited network according to the User subscription and operator limitations/ restrictions if any. Cx-Query Resp is sent from the HSS to the I-CSCF. If the checking in HSS was not successful the Cx-Query Resp shall reject the registration attempt. The I-CSCF shall send Cx-Select (serving network indication, subscriber identity) to the HSS to request the information related to the required S-CSCF capabilities which shall be input into the S-CSCF selection function. The HSS shall send Cx-Select Resp (required S-CSCF capabilities) to the I-CSCF."

Thereafter, the REGISTER message is forwarded to the SCSCF, which in turn basically performs in steps C6 to C9 the same processes as the I-CSCF in FIG. 2 in steps A3 to A6. Also, the calculating and verifying of the MAC in steps C10 C12 corresponds to the steps A7 to A9 in FIG. 2.

After performing a further CxQuery in step C14, the I-CSCF forwards the REGISTER message received in step C13 to the S-CSCF in step C15. The S-CSCF in turn performs the authentication, i.e., checks whether CRES=RES or not.

After performing a Cx-Put (this informs the S.CSCF name to the HSS) in step C17 and a Cx-Pull (the subscriber profile downloaded to S-CSCF) in step C18, the 200 OK message is forwarded to the UE in steps C19 to C21.

The above description and accompanying drawings only illustrate the present invention by way of example. Thus, the embodiment may vary within the scope of the attached claims.

In particular, the embodiments may be combined such that both an early integrity protection and a late integrity protection may be achieved.

Furthermore, it is noted that in the embodiments described above the IM CN SS (Internet Multimedia Core Network Subsystem) was only mentioned as an example. The invention is by no way limited thereon and can be applied to any kind of network system in an authentication is performed. For example, the invention can also be applied to a GSM and UMTS network systems. It can also be applied in $3^{rd}$ generation mobile systems where requirements of home control in authentication of the subscriber are strict, as is typically the case in many systems specified in so-called 3GPP2 in North America.

Moreover, it is noted that the authentication described above is only an example in which a protection of subscriber information during an (initial) registration is required. The invention may be applied to other cases in which subscriber information have to be protected during registration or the like.

The invention claimed is:

1. A network system comprising:
a network control element and a communication device associated to a subscriber, wherein the communication device is configured to send a registration message including subscriber information to be protected and an integrity code, to the network control element,
wherein the communication device is configured to calculate the integrity code by using a part or whole of the registration message including the subscriber information to be protected, and the network element is configured to verify the integrity code included in the registration message,
wherein the network element is configured to perform an authentication of the subscriber by using the integrity code,
wherein the network control element is configured to control a first network, and the network system comprises an additional network control element configured to control a second network, said additional network control element being further configured to perform an additional authentication,
wherein the communication device is configured to calculate a result from a predetermined number supplied by the additional network control element,
wherein the result is used by the additional network control element for performing the additional authentication,
wherein the communication device is configured to send a message including algorithm capability information to the network control element, and
wherein the network control element is configured to choose which algorithm is to be used for calculating the integrity code and to forward a message including information about the chosen algorithm to the communication device.

2. The network system according to claim 1, wherein the subscriber information to be protected comprises information regarding the originator of the registration message.

3. The network system according to claim 1, wherein the subscriber information to be protected comprises information regarding the subscriber to be registered.

4. The network system according to claim 1, wherein the subscriber information to be protected comprises a contact field.

5. The network system according to claim 1, wherein
the communication device is configured to forward the algorithm capability information with the registration message, and
the network control element is configured to verify the algorithm capability information.

6. The network system according to claim 1, wherein
the network control element is configured to forward the algorithm capability information with the message including the information to be protected to the communication device, and
the communication device is configured to verify the algorithm capability information.

7. The network system according to claim 1, wherein the additional authentication is performed by comparing the result received from the communication device with a scheduled result.

8. The network system according to claim 7, wherein the predetermined number and the scheduled result are provided by a home subscriber database, an Authentication Centre or an Authentication Authorization and Accounting server.

9. The network system according to claim 1, wherein the calculation is performed by using GSM or UMTS algorithms.

10. A network system comprising:
a network control element and a communication device associated to a subscriber,
wherein the network control element is configured to receive a registration message from the communication device, to calculate an integrity code by using a part or whole of a message including subscriber information to be protected and to send a message which includes the information to be protected and the integrity code, to the communication device, wherein the communication device is configured to verify the integrity code, wherein the network element is configured to perform an authentication of the subscriber by using the integrity code, wherein the network control element is configured to control a first network, and the network system comprises an additional network control element configured to control a second network, said additional network control element being further configured to perform an additional authentication, wherein the communication device is configured to calculate a result from a predetermined number supplied by the additional network control element, wherein the result is used by the additional network control element for performing the additional authentication, wherein the communication device is configured to send a message including algorithm capability information to the network control element, and wherein the network control element is configured to choose which algorithm is to be used for calculating the integrity code and to forward a message including information about the chosen algorithm to the communication device.

11. The network system according to claim 10, wherein the subscriber information to be protected comprises information regarding the originator of the registration message.

12. The network system according to claim 10, wherein the subscriber information to be protected comprises information regarding the subscriber to be registered.

13. The network system according to claim 10, wherein the subscriber information to be protected comprises a contact field.

14. The network system according to claim 10, wherein
the communication device is configured to forward the algorithm capability information with the registration message, and
the network control element is adapted to verify the algorithm capability information.

15. The network system according to claim 10, wherein
the network control element is configured to forward the algorithm capability information with the message including the information to be protected to the communication device, and
the communication device is configured to verify the algorithm capability information.

16. The network system according to claim 10, wherein the additional authentication is performed by comparing the result received from the communication device with a scheduled result.

17. The network system according to claim 16, wherein the predetermined number and the scheduled result are provided by a home subscriber database, an Authentication Centre or an Authentication Authorization and Accounting server.

18. The network system according to claim 10, wherein the calculation is performed by using GSM or UMTS algorithms.

19. The network system according to claim 10, wherein the message including information to be protected is the registration message received from the communication device.

20. The network system according to claim 10, wherein the message including information to be protected is a response message sent from the network in response to the registration message from the communication device.

21. A method for performing registration of a subscriber in a network system, comprising a network control element and a communication device associated to a subscriber, said method comprising:
sending a registration message including subscriber information to be protected and an integrity code to the network control element, wherein the subscriber information to be protected comprises contact information;
calculating the integrity code in the communication device by using a part or whole of the registration message including the subscriber information to be protected;
verifying the integrity code in the network control element; and
performing an authentication of the subscriber by using the integrity code, wherein the network control element controls a first network, and the network system further comprises an additional network control element controlling a second network, the additional network control element being configured to perform an additional authentication;
calculating a result in the communication device from a predetermined number supplied by the additional network control element;
performing the additional authentication in the additional network control element by using the result;
choosing which algorithm is to be used for calculating the integrity code; and
forwarding a message including information about the chosen algorithm to the communication device.

22. The method according to claim 21, wherein the subscriber information to be protected comprises information regarding the originator of the registration message.

23. The method according to claim 21, wherein the subscriber information to be protected comprises information regarding the subscriber to be registered.

24. The method according to claim 21, further comprising sending a message including algorithm capability information from the communication device to the network control element.

25. The method according to claim 24, further comprising:
forwarding the algorithm capability information with the registration message from the communication device to the network control element; and
verifying the algorithm capability information in the network control element.

26. The method according to claim 24, further comprising:
forwarding the algorithm capability information with the message including the information to be protected from the network control element to the communication device; and
verifying the algorithm capability information in the communication device.

27. The method according to claim 21, further comprising performing the additional authentication by comparing the result received from the communication device with a scheduled result.

28. The method according to claim 27, wherein the predetermined number and the scheduled result are provided by a home subscriber database, an Authentication Centre or an Authentication Authorization and Accounting server.

29. The method according to claim 21, wherein the calculation is performed by using GSM or UMTS algorithms.

30. A method for performing registration of a subscriber in a network system, comprising a network control element and a communication device associated to a subscriber, said method comprising:
sending a registration message from the communication device to the network control element;
calculating an integrity code in the network control element by using a part or whole of the registration message including subscriber information to be protected, wherein the subscriber information to be protected comprises contact information;
sending a message, which includes the information to be protected and the integrity code to the communication device;
verifying the integrity code in the communication device; and
performing an authentication of the subscriber by using the integrity code, wherein the network control element controls a first network, and the network system further comprises an additional network control element controlling a second network, the additional network control element being configured to perform an additional authentication;
calculating a result in the communication device from a predetermined number supplied by the additional network control element;
performing the additional authentication in the additional network control element by using the result;
choosing which algorithm is to be used for calculating the integrity code; and
forwarding a message including information about the chosen algorithm to the communication device.

31. The method according to claim 30, wherein the subscriber information to be protected comprises information regarding the originator of the registration message.

32. The method according to claim 30, wherein the subscriber information to be protected comprises information regarding the subscriber to be registered.

33. The method according to claim 30, further comprising sending a message including algorithm capability information from the communication device to the network control element.

34. The method according to claim 33, further comprising:
forwarding the algorithm capability information with the registration message from the communication device to the network control element; and
verifying the algorithm capability information in the network control element.

35. The method according to claim 33, further comprising:
forwarding the algorithm capability information with the message including the information to be protected from the network control element to the communication device; and
verifying the algorithm capability information in the communication device.

36. The method according to claim 30, further comprising performing the additional authentication by comparing the result received from the communication device with a scheduled result.

37. The method according to claim 36, wherein the predetermined number and the scheduled result are provided by a home subscriber database, an Authentication Centre or an Authentication Authorization and Accounting server.

38. The method according to claim 30, wherein the calculation is performed by using GSM or UMTS algorithms.

39. The method according to claim 30, wherein the message including information to be protected is the registration message received from the communication device.

40. The method according to claim 30, wherein the message including information to be protected is a response message sent from the network in response to the registration message from the communication device.

41. A network system comprising:
a network control element and a communication device associated to a subscriber,
wherein the communication device is configured to send a registration message including algorithm capability information to the network control element,
wherein the network control element is configured to choose which algorithm is to be used for calculating an integrity code and to send a corresponding message to the communication device,
wherein the network control element or the communication device is configured to verify the algorithm capability information on a later transmittal of a message including the algorithm capability information.

42. The network system according to claim 41, wherein the communication device is configured to calculate an integrity code by using a part or whole of a registration message and to forward the registration message and the integrity code to the network control element.

43. The network system according to claim 42, wherein the communication device is configured to forward also information regarding the used algorithm.

44. The network system according to claim 43, wherein the network control element is configured to verify the integrity code on receiving the registration message from the communication device by using the information regarding the used algorithm.

45. The network system according to claim 41, wherein the network control element is configured to calculate an integrity code by using a part or whole of a registration message received from the communication device and to forward a message and the integrity code to the communication device.

46. The network system according to claim 45, wherein the network control element is configured to forward also information regarding the used algorithm.

47. The network system according to claim 46, wherein the communication device is configured to verify the integrity code on receiving the message from the network control element by using the information regarding the used algorithm.

48. A method, comprising:
sending a registration message including algorithm capability information from a communication device associated to a subscriber to a network control element;
choosing which algorithm is to be used for calculating an integrity code;
sending a corresponding message to the communication device;
verifying the algorithm capability information on a later transmittal of a message including the algorithm capability information in the network control element and/or the communication device; and
completing registration of the subscriber based on the verified algorithm capability information.

49. The method according to claim 48, further comprising:

calculating an integrity code by using a part or whole of a registration message; and forwarding the registration message and the integrity code from the communication device to the network control element.

50. The method according to claim 49, further comprising forwarding also information regarding the used algorithm to the network control element.

51. The method according to claim 50, further comprising the step of verifying the integrity code on receiving the registration message from the communication device by using the information regarding the used algorithm.

52. The method according to claim 48, further comprising:

calculating an integrity code by using a part or whole of a registration message received from the communication device; and forwarding a message and the integrity code to the communication device.

53. The method according to claim 52, further comprising forwarding also information regarding the used algorithm to the communication device.

54. The method according to claim 53, further comprising verifying the integrity code on receiving the message from the network control element by using the information regarding the used algorithm.

55. A network system, comprising:

a network control element and a communication device associated to a subscriber;

sending means for sending a registration message including subscriber information to be protected and an integrity code to the network control element, wherein the subscriber information to be protected comprises contact information;

calculating means for calculating the integrity code in the communication device by using a part or whole of the registration message including the subscriber information to be protected;

verifying means for verifying the integrity code in the network control element; and performing means for performing an authentication of the subscriber by using the integrity code, wherein the network control element controls a first network, and the network system further comprises an additional network control element controlling a second network, the additional network control element being configured to perform an additional authentication;

calculating means for calculating a result in the communication device from a predetermined number supplied by the additional network control element;

performing means for performing the additional authentication in the additional network control element by using the result;

choosing which algorithm is to be used for calculating the integrity code; and forwarding a message including information about the chosen algorithm to the communication device.

* * * * *